United States Patent [19]

Iwasaki et al.

[11] 4,251,842
[45] Feb. 17, 1981

[54] MAGNETIC RECORDING AND REPRODUCING DEVICE

[75] Inventors: Shunichi Iwasaki, 11-35, Kunimi 1-chome, Sendai-shi, Miyagai-ken, Japan; Yoshihisa Nakamura, Izumi, Japan

[73] Assignees: Shunichi Isasaki; Sony Corporation; Fujitsu Limited, all of Tokyo, Japan; a part interest to each

[21] Appl. No.: 945,295

[22] Filed: Sep. 25, 1978

[30] Foreign Application Priority Data

Sep. 30, 1977 [JP] Japan ................. 52-11745

[51] Int. Cl.³ .................. G11B 5/78; G11B 5/12; G11B 5/25
[52] U.S. Cl. .................... 360/134; 360/110; 360/119
[58] Field of Search ............ 360/134, 135, 136, 131, 360/119, 125, 110, 55; 365/133

[56] References Cited

U.S. PATENT DOCUMENTS

| | | | |
|---|---|---|---|
| 3,052,567 | 9/1962 | Gabor et al. | 360/131 |
| 3,185,775 | 5/1965 | Camras | 360/134 |
| 3,438,010 | 4/1969 | Fuller | 360/133 |
| 4,075,384 | 2/1978 | Suzuki | 360/131 |

Primary Examiner—Vincent P. Canney
Attorney, Agent, or Firm—Staas & Halsey

[57] ABSTRACT

A magnetic recording and reproducing device using a double-layered magnetic recording medium having a first layer with an anisotropy perpendicular to the medium plane and having a second layer with a lower coercive force than the first layer. A single pole magnetic head is arranged so as to magnetize the recording medium in a direction perpendicular to the recording medium plane.

13 Claims, 11 Drawing Figures

FIG. 4.
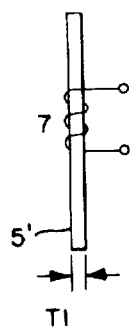
FIG. 5a.
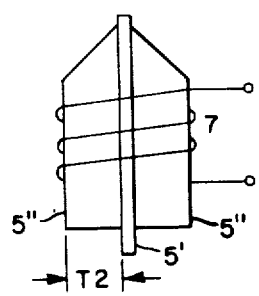
FIG. 5b.
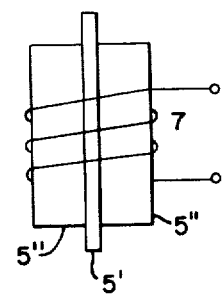
FIG. 5c.
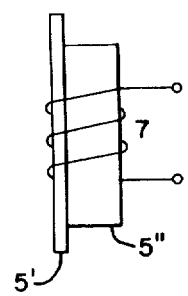
FIG. 5d.
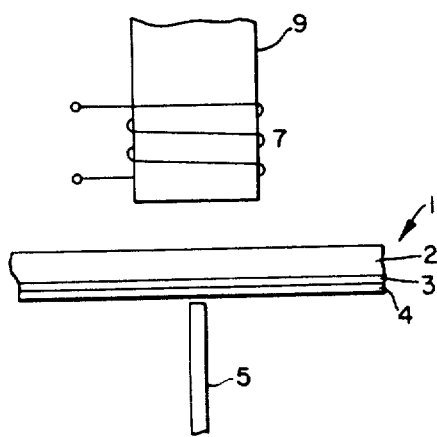
FIG. 6.

MAGNETIC RECORDING AND REPRODUCING DEVICE

BACKGROUND OF THE INVENTION

1. Field of the Invention

This invention relates to a magnetic recording and reproducing device using a double-layered magnetic recording medium comprising a first magnetic recording layer for magnetic recording which has anisotropy perpendicular to the medium plane and a second magnetic layer having a lower coercive force than that of the first magnetic recording layer; information is recorded by magnetizing the recording medium in a direction perpendicular to the recording medium plane. The recording is effected by using a single pole magnetic head and the information is reproduced by using a ring type magnetic head.

2. Description of Prior Art

In currently used magnetic recording and reproducing devices for computer systems, (for example: magnetic disk units, magnetic tape units, magnetic drum units, and flexible disk units), magnetic materials are formed on a solid or flexible non-magnetic substrate by coating or electroposition techniques. These magnetic materials are used as the recording medium and data recording and reproducing can be effected by using a ring type magnetic head. In such a magnetic recording and reproducing device, magnetization of the recording medium in the direction of movement, (defined as the longitudinal direction), is employed. However, such a recording system, (hereinafter referred to as a longitudinally magnetized recording system), has the following disadvantage. Namely, when the recording density is increased, the demagnetization field in the medium increases and such an increase in the demagnetizing field causes the attenuation and the rotation of the residual magnetization resulting in a reduction of the output amplitude during reproduction.

Therefore, various improvements have been proposed in order to realize a higher recording density using conventional longitudinally magnetized recording systems. In order to reduce the aforementioned demagnetization in longitudinally magnetized recording systems, the saturation magnetization of the magnetic recording layers must be reduced and the magnetic recording layers must be made thinner. In addition, the coercive force of the magnetic recording layers must be increased. Furthermore, the saturation magnetization density of the core material of the recording head core must be made larger so as to sufficiently magnetize the recording layers. Furthermore, in order to increase the amplitude of the reproducing output and improve the output resolution, the spacing between the recording medium and the magnetic heads, (i.e.-the head floating height), and the reproduction gap length must be made as small as possible.

In order to improve the aforementioned conditions, efforts have been made to fabricate a thin magnetic material having a high coercive force for use as the recording medium layer. However, various difficulties have been encountered, such as the difficultly in producing a homogeneous magnetic thin film having high yields and the difficulty of producing a magnetic material having the proper magnetic characteristic so as to enable the generation of a signal sufficient for reproduction when said material is applied in a very thin layer.

High density recording techniques furthermore result in the following problems with respect to the recording and reproducing heads. The floating stability in a recording system having a small head floating height must necessarily be high and the floating stability is largly dependant on the mechanical characteristics of the system such as the surface roughness of the magnetic recording layer as well as the layer strength and adhesion of the magnetic recording layer. Furthermore, the core material of the recording and reproducing heads must have a sufficiently high saturation magnetization to enable the recording of data onto a magnetic recording medium having a high coercive force.

Magnetic materials such as Permalloy and Sendust have been used as a recording and reproducing head core material having a high saturation magnetic flux density. However, these magnetic metals have poor high frequency characteristics due to their small specific resistance and can be used only when formed into multi-layered cores. Furthermore, very thin layers of the magnetic materials must be fabricated for magnetic recording and reproducing heads requiring a high frequency response. The use of such multi-layered thin layered core materials is very disadvantageous from the manufacturing standpoint.

At present, for magnetic recording and reproducing heads having a frequency response as high as 5 MHz or so, a ferrite material (e.g.-nickel-zinc ferrite, or manganese-zinc ferrite) are used. However, the saturation magnetization of such ferrites is as high as 4000 Gausses and the coercive force of a recording medium which can be used with a magnetic recording head using such ferrites is limited to recording mediums having a coercive force at or below 700 Oe.

As noted above, in conventional magnetic recording systems using longitudinal magnatization of the recording medium, it is difficult to realize a high density magnetic recording device having high frequency recording capability due to the technological problems of manufacturing a recording medium which reduces the influence of demagnetization due to the residual magnetization and the problems of fabricating recording and reproducing cores suitable for such a recording medium.

In order to solve some of the above-noted problems, the present inventors have developed a perpendicular recording system, (hereinafter referred to as a perpendicularly magnetized recording system), using a single pole magnetic head in conjunction with a magnetic layer having a easy axis of magnatization perpendicular to the medium plane. This system was described on pages 184 and 187 of the Text of National Convention of Electronic and Communication Society of Japan, 1976 and disclosed in Japanese patent application Numbers 51-51574 and 51-106506, respectively laid open on Nov. 11, 1977 under unexamined publication number 134,706/77 and Mar. 25, 1978 under unexamined publication number 32,009/78.

SUMMARY OF THE INVENTION

The purpose of this invention is to improve the writing efficiency during both recording and reproducing as well as to simplify the reproduction circuitry used in a magnetic recording and reproducing system adopting the previously cited perpendicularly magnetized recording techniques.

BRIEF DESCRIPTION OF THE DRAWINGS

FIG. 4 illustrates the wave forms for the embodiment of the invention illustrated in FIG. 3.

FIGS. 5 a-d and 6 illustrate other examples of a single pole magnetic head used in the present invention.

In FIGS. 1-8, the following common numerical designations have been used:
1—Magnetic recording medium
2—Substrate material
3—Second magnetic layer
4—First magnetic layer
5—Recording head
6—Reproduction head
7—Recording head coil
8—Reproduction head coil
9—Second auxiliary pole
10—Amplifier circuit
11—Diffentiator circuit
12—Waveform shaper circuit
13—Signal output

DESCRIPTION OF THE PREFERRED EMBODIMENTS

Figure 1:
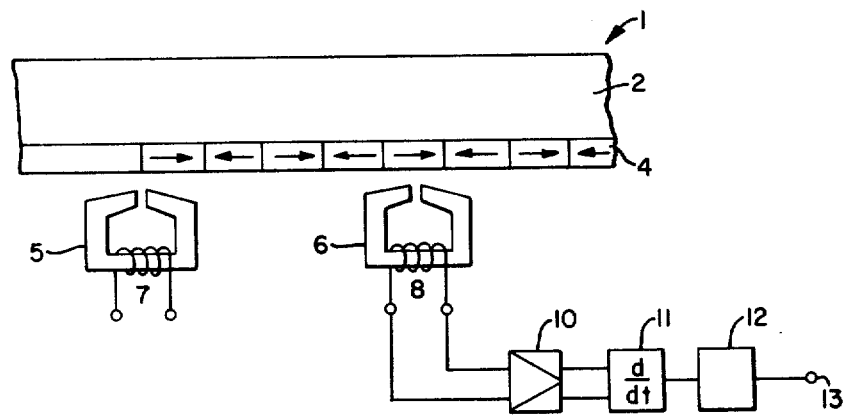
FIG. 1 illustrates a prior art recording and reproducing device.

FIG. 1 illustrates a prior art magnetic recording and readout device utilizing conventional longitudinal magnetization recording techniques. In this drawing figure, magnetic recording medium 1 is illustrated as being composed of a magnetic layer 4 formed on a non-magnetic solid or flexible substrate 2. Recording head 5 is illustrated as being a ring type head. A write current corresponding to the data to be recorded is applied to coil 7 of the recording head 5 so as to record the data on the recording medium in the form of magnetized segments which are horizontal to the medium plane as indicated by the arrows illustrated on the magnetic layer 4. Reproduction head 6 is also illustrated as being a ring type head. When there is relative motion between the recording medium 1 and the reproduction head 6, an output voltage is generated across coil 8 in accordance with the magnetized condition of the magnetic layer 4, thus enabling the stored data to be read out.

Figure 2:
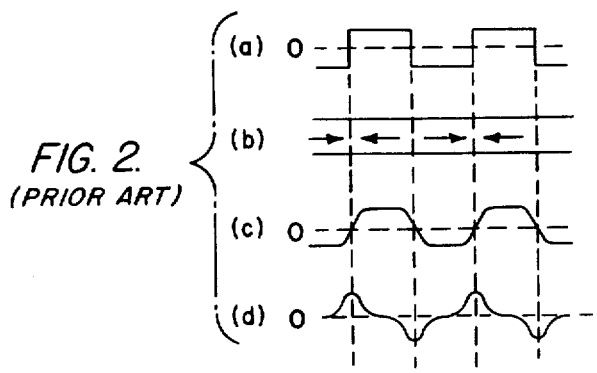
FIG. 2 illustrates signal waveforms of the recording and reproducing device of FIG. 1.

FIG. 2 illustrates the waveforms on the recording and reproducing device of FIG. 1, arranged to operate as a NRZ recording system. FIG. 2(a) illustrates the write current waveform passing through coil 7 of the recording head 5. FIG. 2(b) illustrates the residually magnetized condition on the corresponding magnetic layer 4 of the recording medium 1. When the recording medium 1 passes by the reproduction head 6, a magnetic flux is generated inside the core of the reproduction head as illustrated in FIG. 2(c). This magnetic flux causes a voltage to be generated across coil 8 of the reproduction head 6 as illustrated in FIG. 2(d). Note that the output voltage across coil 8 has peak amplitude points at those points where the magnetic flux passing the reproduction head changes direction.

The output voltage across coil 8 is first amplified by the amplifier circuit 10 and then differentiated by the differentiator circuit 11. Thus, the peak amplitude points of the voltage waveform across coil 8, as illustrated in FIG. 2(d), are converted to zero crossing points. The differentiated signal, after conditioning by the waveform shaper circuit 12, is provided to output terminal 13 as the reproduced data signal.

The reason that the differentiator circuit 11 is required is that the peak amplitude levels of the signal generated across coil 8 change due to the influence of noise, etc. This will cause data errors if normal fixed threshold detection methods were utilized. However, by utilizing the differentiator 11, amplitude variations are immaterial since the peak value points of the signal generated across coil 8 are now converted into zero crossing points which are less susceptible to amplitude variation problems.

As previously noted, the longitudinally magnetized recording system has various problems and is somewhat limited with respect to very high density recording. The present invention, as described below, is an improvement on the aforementioned prior art system in that the writing efficiency is increased at the time of recording and the reproduction efficiency is correspondingly improved. Furthermore, the reproduction circuitry is simplified when the perpendicularly magnetized recording system of the present invention is utilized.

Figure 3:
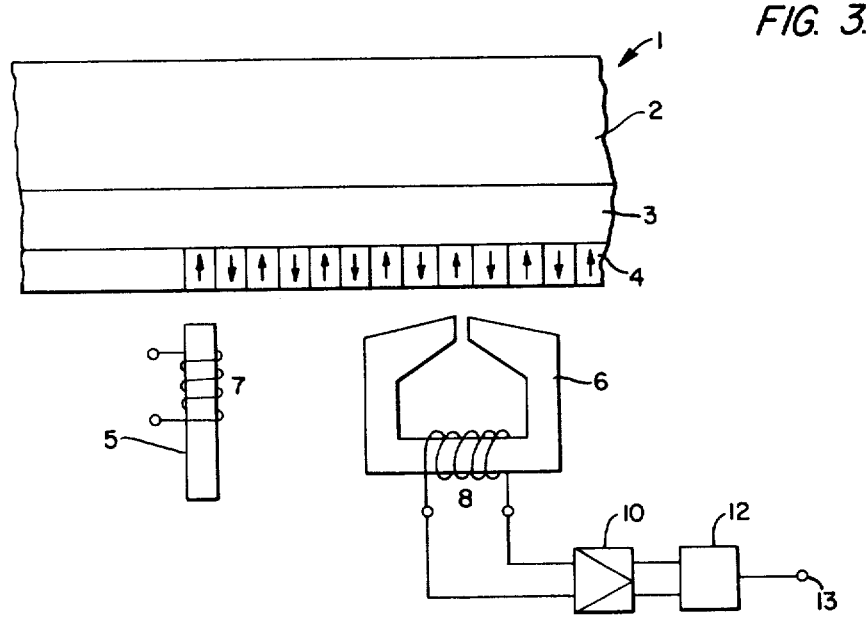
FIG. 3 illustrates an embodiment of the present invention.

FIG. 3 illustrates an embodiment of the present invention. The magnetic recording medium 1 is composed of a double-layered magnetic layer material consisting of a second magnetic layer 3 formed on the solid or flexible non-magnetic substrate 2 and a first magnetic layer 4 having an easy axis of magnetization perpendicular to the medium plane and formed over the second magnetic layer 3.

The first magnetic layer 4, having an easy axis of magnetization perpendicular to the medium plane, may be fabricated as a magnetic layer having a thickness of 3 $\mu$m or less and including cobalt and chromium in its composition. Typically, the magnetic layer contains 5 to 25% weight of chromium. This magnetic layer has characteristics such that it may be utilized for a perpendicularly magnetized recording system with a saturated magnetization Ms of 100 to 1100 Gausses and a coercive force of 300 to 2000 Oe.

Furthermore, the first magnetic layer may comprise those materials where the $\gamma$-Fe$_2$O$_3$ coating layer is oriented perpendicular to the medium plane, optical magnetic materials such as MnAlGe, MnGaGe, MnBi etc., amorphous magnetic bubble materials such as GdFe, GdCo, SmFe, SmCo etc., and magneto planbite materials such as Ba ferrite, Pb ferrite etc.

The second magnetic layer 3 consists of a layer of a material such as Permalloy, having a thickness of at least 0.1 $\mu$m and formed by means of sputtering or electrodeposition techniques. The coercive force of the second magnetic layer is preferably 1/5 or less of that of the first magnetic layer and more preferably 300 Oe or less.

A single pole type recording head 5 is illustrated in FIG. 3. The use of such a recording head in conjunction with coil 7 generates a magnetic field perpendicular to the record medium plane and records data in the form of perpendicular magnetization, as indicated by the arrows shown on the first magnetic layer 4, and having perpendicular anisotropy. During recording, the second magnetic layer 3 acts as an auxiliary pole to the recording head 5, thereby effecting an image pole for the pole generated at the edge of the recording head 5 within the magnetic layer 3. Thus, the field intensity generated by recording head 5 is higher than that generated by a prior art recording head provided with an identical write current. Thus, the write efficiency of the present invention is improved over that of the prior art.

Reproduction head 6, on the other hand, is identical to the ring type heads of prior art systems and the data recorded in the magnetic medium may be reproduced by such a reproduction head 6.

FIG. 4 illustrates the waveforms of the embodiment illustrated in FIG. 3 utilizing NRZ recording techniques as an example. FIG. 4(a) illustrates the waveform of the write current provided to coil 7 of the recording head 5. FIG. 4(b) illustrates the residual magnetization condition on the corresponding recording medium. When the recording medium passes by the reproduction head 6, a magnetic flux passes through the core of reproduction head 6 as illustrated in FIG. 4(c).

At the position where the magnetization on the recording medium becomes inverted, the magnetic flux passes the core through both edges of the gap of reproduction head 6 and its amplitude becomes a maximum. When the position of the recording head with respect to the medium nears the point at the center of the data bit (near the center position of the segment wherein the magnetized condition is homogeneous), the magnetic flux passing through the reproduction core decreases since the leakage magnetic flux from the recording medium is perpendicular and at the center of the data bit becomes almost zero.

In comparing the waveforms of the prior art system of FIG. 2 to the waveforms of the present invention as illustrated in FIG. 4, it is noted that in the present invention, the magnetic flux entering both edges of the gap of the reproduction head 6 changes direction at the position whereby the magnitization on the recording medium is inverted and the resulting amount of magnetic flux passing through the core becomes zero. Furthermore, at the center of a data bit, the leakage horizontal magnetic flux from the medium passes the core and is almost constant until the next inversely magnetized position. Accordingly, the voltage waveform of coil 8 of read out head 6 has a zero crossing at the position where the amount of magnetic flux in the core becomes maximum, namely, at the position where the magnetization is inverted on the recording medium as shown in FIG. 2(d). Such an output corresponds to the output waveform of the differentiator circuit 11 in the prior art recording and reproduction devices illustrated in FIG. 1. Thus, as illustrated in FIG. 3, the output of the reproduction head 6 of the present invention is amplified by amplifier circuit 10 and then conditioned by the waveform shaper circuit 12 without the necessity of a differentiator circuit 11. The output signal is then provided on output terminal 13.

Thus, in a recording and reproduction device in accordance with this invention, high density recording based on the use of perpendicular magnetization becomes possible and differential operation is performed magnetically by the reproduction head. Thus, a differentiator circuit is not required and the reproduction circuitry can be simplified. Furthermore, the influence of noise generated by prior art diffentiator circuitry is eliminated and the error rate of the reproduced signal is vastly improved.

Experiments with recording and reproducing devices in accordance with the present invention have shown that in the case where the ring type magnetic head 6 illustrated in FIG. 3 is used as the reproduction head or in the case where a single pole magnetic head is used as the recording head, the reproduction output using the single pole magnetic head is −20 dB when the reproduction output using the ring type magnetic head is 0 dB. In other words, there is a difference of about 20 dB in the relative output. Thus, a ring type magnetic head provides a higher reproduction efficiency.

FIGS. 5a–d illustrates examples of several different types of single pole magnetic heads which may be used as the recording head of a device in accordance with the present invention. FIG. 5a illustrates a head having a coil 7 wound around a Permalloy element 5'. In the configurations illustrated in FIGS. 5b, 5c, and 5d, ferrite element or elements 5" are provided on either one side or both sides of the Permalloy element 5' so as to avoid the magnetic saturation of the Permalloy element 5'. The coil 7 is then wound around the composite magnetic structure.

In FIGS. 5a–d, the thickness $T_1$ of the Permalloy element may typically be 1.6 μm while the thickness $T_2$ of the ferrite elements is on the order of 700 μm.

FIG. 6 illustrates another embodiment of the recording head 5. In this additional embodiment, a second auxiliary pole 9 is provided at a position facing the principal pole. Thus, a single pole type magnetic head 5 is on one side of the magnetic recording medium 1 while the second auxiliary pole 9 is placed on the other side of the magnetic recording medium 1. This second auxiliary pole 9 has coil 7 wound around it. A magnetic head of this type has a higher efficiency the heads illustrated in FIGS. 5a–d due to the fact that an intensified magnetic field is induced at the edge of the principle pole 5 by the activation of the second auxiliary pole 9.

Figure 7:
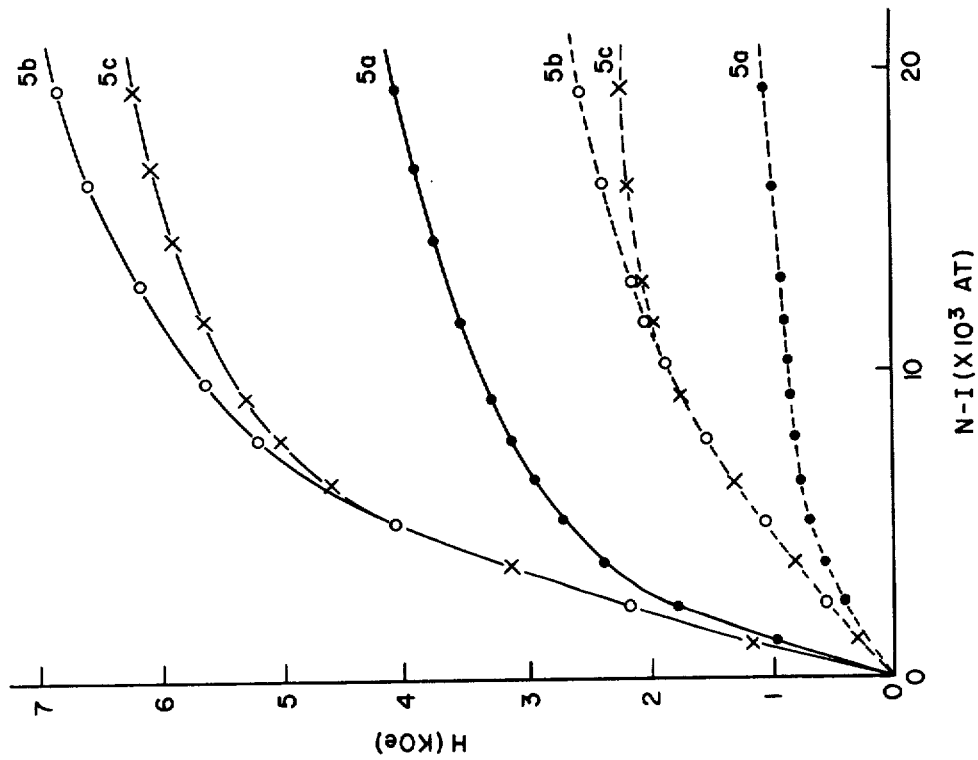
FIG. 7 illustrates the magnetmotive force of the recording head used in the present invention.

FIG. 7 illustrates the results of experiments comparing the magnetomotive force of the recording head in the case when the second magnetic layer 3 is provided vs. the case where no second magnetic layer 3 is provided.

The curves shown by the solid lines correspond to those cases wherein a one μm sputtered Permalloy film is provided as the magnetic layer 3, while the curves having dotted lines correspond to those cases wherein no magnetic layer 3 has been used. The designations 5a, 5b, and 5c correspond to the designations of the recording heads illustrated in FIGS. 5a–d. Curves of FIG. 7 plot the ampere turns of the recording heads in the horizontal axis and the field intensity (Oe) in the vertical axis. The field intensity measuring position is determined in accordance with the relation: $Sb/T_1 = 0.5$ under the supposition that the thickness of the recording head is defined to be $T_1$ and the head floating height from the surface of the recording medium to the recording head is defined to be Sb.

As is clear from FIG. 7, the magnetomotive force of the recording head is considerably larger when the magnetic layer 3 is present as compared to the identical configuration when the magnetic layer 3 is not provided. Thus, because of the fact that the magnetic layer 3 functions as an auxiliary pole, the writing efficiency is drastically improved during the writing operation.

Figure 8:
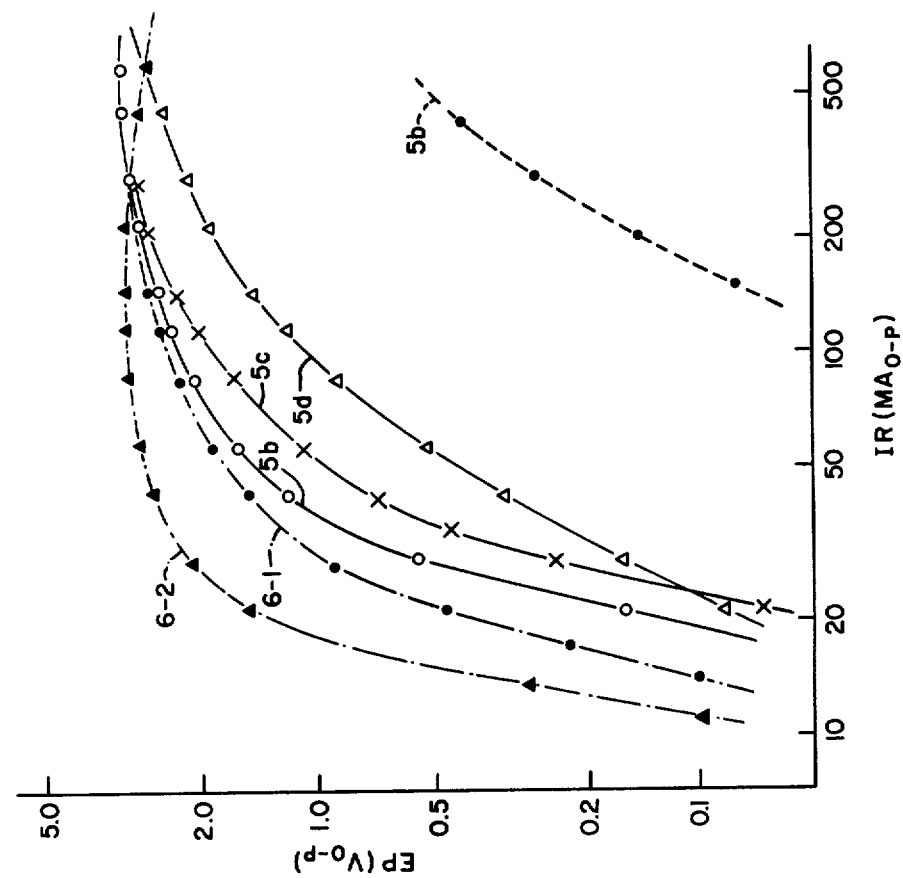
FIG. 8 illustrates the relationship between the recording current and the reproduction voltage amplitude of a recording and reproducing device in accordance with the present invention.

FIG. 8 illustrates the relationship between the recording current and the reproduction voltage characteristics of a magnetic recording and reproducing device in accordance with the present invention. The horizontal axis indicates the writing current during recording, while the verticle axis represents the reproduction output voltage $E_p$.

In FIG. 8, both the solid line curves and the dot/dash curves illustrate the current and voltage values when the second magnetic layer 3 is present. The dotted curve corresponds to the condition when no such magnetic layer 3 is used. Curves 5b, 5c, and 5d illustrate the reproduction outputs obtained using the single pole head configurations 5b, 5c, and 5d of FIG. 5 as the recording head, while the reproduction operation is carried out using a standard ring type magnetic head. Curves 6-1 and 6-2 illustrate the reproduction output obtained using the recording head illustrated in FIG. 6 and reproduction using a standard ring type magnetic head. Curve 6-1 corresponds to the case in which the thickness of the principal pole is 1.6 μm while curve 6-2 corresponds to the case in which the thickness of the principal pole is 3.2 μm.

The recording medium used in FIG. 8 consisted of a 1 μm first magnetic layer consisting of a chromium/cobalt alloy and a 1 μm Permalloy layer for the second magnetic layer.

As is apparent from FIG. 8, the use of the second magnetic layer 3 increases the reproduction output in comparison to the output obtained when no second magnetic layer is used, thus the writing efficiency is greatly increased.

In FIG. 8, the voltage output is that obtained from an amplifier 10 having a 60 dB gain.

In the above noted embodiments, the first magnetic layer and the second magnetic layer are formed adjacent to each other. However, it is also possible to form the first and second magnetic layers with an intermediate nonmagnetic layer therebetween. This intermediate nonmagnetic layer may serve to strengthen the adhesion between the magnetic layers and simultaneously effect the diffusion of the second magnetic layer. Insulators such as $SiO_2$, $TiO_2$, and $Al_2O_3$, or metals such as Ti, Cr, Al, Mo, W, Cu and Au may be used as such a nonmagnetic intermediate layer.

As noted above, in accordance with the present invention utilizing the perpendicular magnetization technique, the first magnetic film has an anisotropy perpendicular to the medium plane and the soft or semi-hard second magnetic layer is formed into the double-layered recording medium. Furthermore recording is performed by the use of a single pole type magnetic head while reproduction utilizes a ring type magnetic head. The reproduction circuitry has been simplified while the writing efficiency during recording and the reproduction efficiency during play-back have been improved. Thus, a recording and reproducing device in accordance with the present invention is very effective for realizing high density high output recording systems.

In the present invention, the second magnetic layer 3 may also have no orientation of anisotropy or may have an easy axis of magnetization in the medium plane.

In addition, while the above-noted description of the preferred embodiment illustrates the use of the present invention with NRZ techniques, FM recording techniques, MFM recording techniques, or other recording techniques may also be utilized.

While the above referenced embodiments of the invention have been described in considerable detail, it will be appreciated that other modifications and variations therein may be made by those skilled in the art without departing from the true spirit and scope of the invention.

We claim:

1. A magnetic recording and reproducing device for storing and reproducing data, comprising a magnetic recording medium, a recording head, and a reproducing head;
   said magnetic recording medium, recording head, and reproducing head operatively connected to a mechanical means for causing relative motion between said magnetic recording medium and said recording and reproducing heads;
   said magnetic recording medium comprising a double-layered magnetic thin film comprising a first magnetic recording layer having a first inherent coercive force and having an easy axis of magnetization perpendicular to the locus of the path of the relative motion between said magnetic recording medium and said recording and reproducing heads and comprising a second magnetic layer having a second inherent coercive force smaller than that of said first coercive force of said first recording layer;
   said recording head, in response to a data input signal, generating a magnetic field perpendicular to the plane of said magnetic recording layer, whereby said recording head forms a main magnetic pole and said second magnetic layer forms a magnetic image pole;
   said magnetic field altering the residual magnetization of said first magnetic recording layer in correspondence with said data input signals to thereby store said signals;
   said reproducing head, in response to said residual magnetization of said first magnetic recording layer, generating a voltage in correspondence with said residual magnetization of said first magnetic recording layer, thereby reproducing an approximation of said data input signal stored in said first magnetic recording layer.

2. A magnetic recording and reproducing device according to claim 1, wherein said magnetic recording head comprises a single pole type magnetic head comprising a rod of high saturation magnetic material surrounded by an electrical coil.

3. A device according to claim 2 further comprising at least one ferrite rod adjacent to said rod of high saturation material, said at least one ferrite rod also surrounded by said electrical coil.

4. A magnetic recording and reproducing device in accordance with claim 1, wherein said magnetic recording head comprises a rod of high saturation magnetic material arranged perpendicular to the plane of said magnetic recording medium and a second auxiliary pole comprising a magnetic material rod surrounded by an electrical coil and arranged such that said high saturation magnetic material rod and said auxiliary pole are on the same axis with said magnetic recording medium sandwiched therebetween.

5. A device according to claim 1, or 2, or 3, or 4, wherein said first magnetic layer has a thickness no greater than 3 μm.

6. A device according to claim 5, wherein said first magnetic layer has a composition comprising cobalt and chromium.

7. A device according to claim 6 wherein said composition comprises chromium within a range of from 5 to 25% by weight.

8. A device according to claim 5, wherein said first magnetic layer has a saturation magnetization in the range of between 100 to 1100 Gauss.

9. A device according to claim 8, wherein said first magnetic layer has a coercive force in the range of between 300 to 2000 Oe.

10. A device according to claims 1 or 2 or 3 or 4, wherein said second magnetic layer has a thickness of at least 0.1 μm.

11. A device according to claim 10, wherein said second magnetic layer comprises a material having a coercive force less than or equal to 1/5 the coercive force of said first magnetic layer.

12. A device according to claim 1, wherein said magnetic recording medium comprises an intermediate nonmagnetic layer sandwiched between said first and second magnetic layers.

13. A magnetic recording and reproducing device according to claim 1, wherein said magnetic reproducing head comprises a ring type magnetic head comprising a ring type magnetic material surrounded by an electrical coil.

* * * * *